(12) United States Patent  
Nordenfelt et al.

(10) Patent No.: US 9,001,205 B2  
(45) Date of Patent: Apr. 7, 2015

(54) SYSTEM AND METHODS FOR CONTROLLING A SURVEYING DEVICE

(75) Inventors: Mikael W. Nordenfelt, Bergshamra (SE); Marc A. Howell, Albany, OR (US); Robert M. Miller, Commerce City, CO (US); Volker Koehler, Paris (FR); Omar Soubra, Westminster, CO (US); Nico Becke, Wunstorf (DE)

(73) Assignee: Trimble Navigation Ltd., Sunnyvale, CA (US)

( * ) Notice: Subject to any disclaimer, the term of this patent is extended or adjusted under 35 U.S.C. 154(b) by 529 days.

(21) Appl. No.: 13/302,128

(22) Filed: Nov. 22, 2011

(65) Prior Publication Data

US 2013/0100279 A1 Apr. 25, 2013

Related U.S. Application Data

(60) Provisional application No. 61/549,431, filed on Oct. 20, 2011.

(51) Int. Cl.
| | |
|---|---|
| *H04N 7/18* | (2006.01) |
| *G01C 3/08* | (2006.01) |
| *G01C 9/00* | (2006.01) |
| *H04N 5/232* | (2006.01) |

(52) U.S. Cl.  
CPC . *H04N 5/232* (2013.01); *H04N 7/18* (2013.01)

(58) Field of Classification Search  
USPC .................... 348/135; 356/3.01–3.05; 33/293  
See application file for complete search history.

(56) References Cited

U.S. PATENT DOCUMENTS

| 2008/0007723 A1* | 1/2008 | Yamaguchi ................ 356/141.1 |
| 2009/0144995 A1* | 6/2009 | Yahagi et al. .................. 33/293 |
| 2009/0244277 A1* | 10/2009 | Nagashima et al. .......... 348/135 |

* cited by examiner

*Primary Examiner* — Nhon Diep  
*Assistant Examiner* — Tsion B Owens  
(74) *Attorney, Agent, or Firm* — K&L Gates LLP

(57) ABSTRACT

A system and methods are provided for controlling a surveying device. In one embodiment, a method includes displaying a control screen including image data captured by a surveying device, detecting an input associated with the control screen, and determining a control command for the surveying device based on the input associated with the control screen. The method may further include controlling operation of the surveying device based on the control command, wherein the surveying device is configured to rotate in one more of a horizontal and vertical direction based on the control command. The device and methods may advantageously allow for precise pointing of a surveying device and translation of input position to surveying device commands.

55 Claims, 16 Drawing Sheets

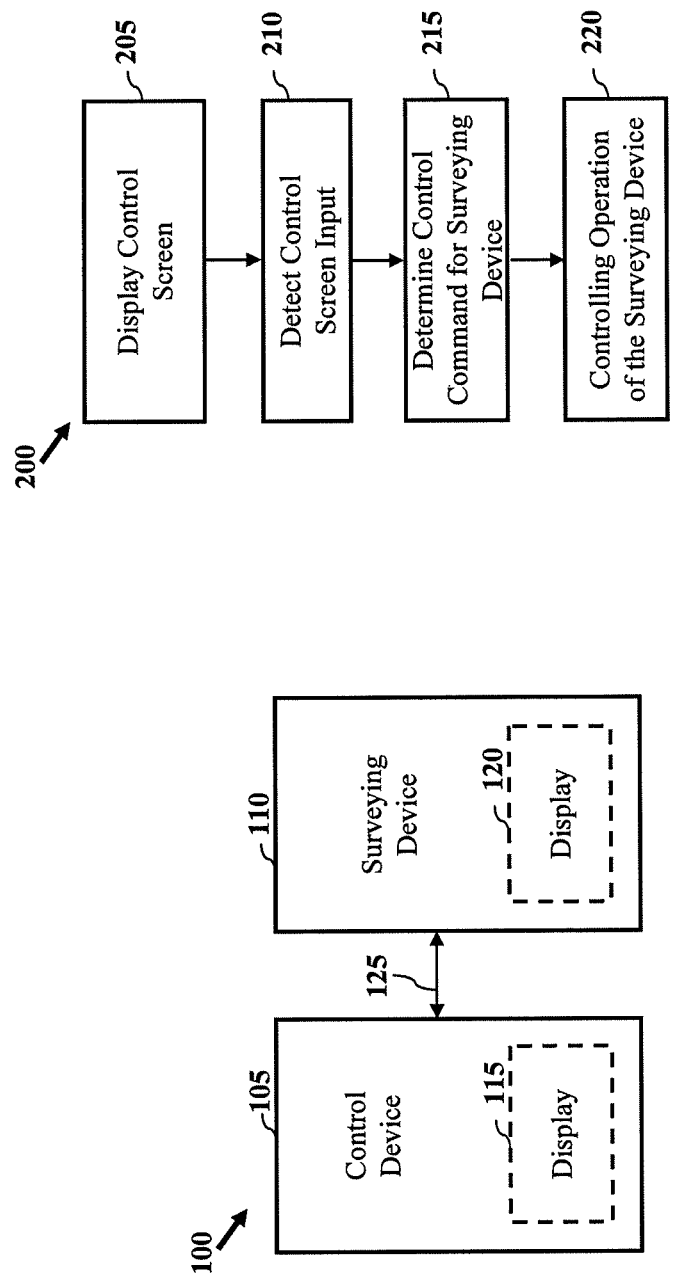

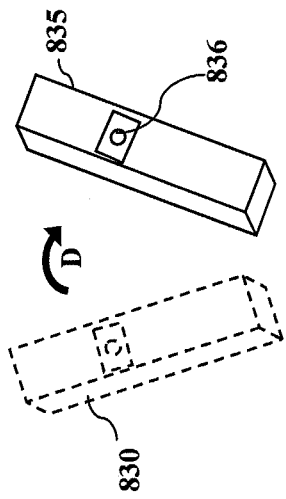
FIG. 8B
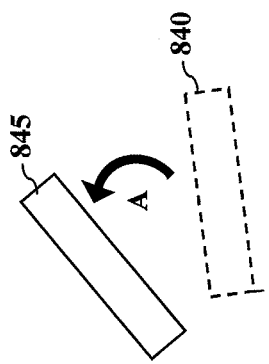
FIG. 8C
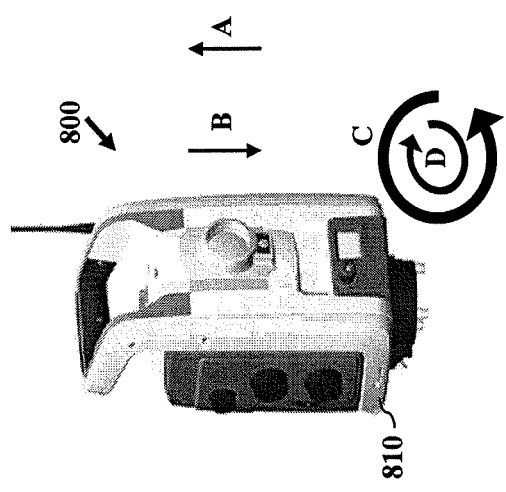
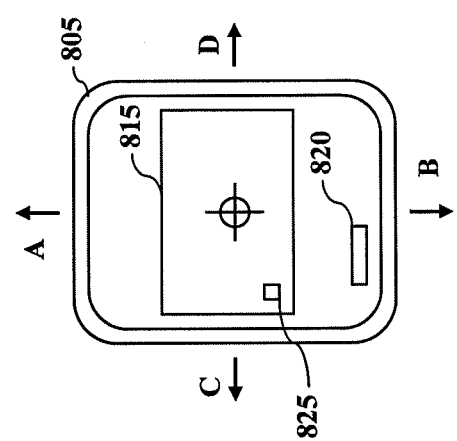
FIG. 8A

SYSTEM AND METHODS FOR CONTROLLING A SURVEYING DEVICE

CROSS-REFERENCE TO RELATED APPLICATION

The application claims priority to U.S. Provisional Application No. 61/549,431 filed on Oct. 20, 2011, and entitled "Systems and Methods for Controlling a Surveying Device", the disclosure of which is hereby incorporated by reference in its entirety.

FIELD

The present disclosure relates generally to electronic devices and methods, and more particularly to a system and methods for controlling a surveying device.

BACKGROUND

Current solutions for control of operation of a surveying device allow for controlled aim of the surveying device. Similar conventional features include imaging capabilities of surveying devices. Adjustment of the surveying device may be based on an optical eyepiece or one or more targets, such as a tracked or locked prism. Although conventional methods allow for controlled movement of a surveying device, many of these systems do not allow for precise control. Another drawback may be difficulty in aiming or controlling a device from a distance. Further, the conventional devices and methods, do not allow for precise control of a surveying device using a control screen. Once conventional approach is to control of surveying device employs based on an input vector, wherein the vector input may be used to control the position of the surveying device. In many cases, input vectors do not allow for finite control of the surveying device. The vector inputs are difficult to control for measuring varying distances. It may be difficult to point a surveying device at varying distances using a control device as conventional approaches do not account for the distance of a target. Similarly, these input controls have limited functionality. Thus, improved control of surveying devices is desired to allow for improved control and reduce time required for measurements.

BRIEF SUMMARY OF THE EMBODIMENTS

Disclosed and claimed herein are a device and methods for controlling a surveying device. In one embodiment, a method includes displaying, by a device, a control screen including image data captured by a surveying device, detecting an input associated with the control screen, and determining a control command for the surveying device based on the input associated with the control screen. The method further includes controlling, by the device, operation of the surveying device based on the control command, wherein the surveying device is configured to rotate in one more of a horizontal and vertical direction based on the control command. Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 1 depicts a simplified system diagram according to one or more embodiments;

FIG. 2 depicts a process for controlling a surveying device according to one or more embodiments;

FIGS. 8A-8C depict graphical representations of wand functionality according to one or more embodiments;

DETAILED DESCRIPTION OF THE EXEMPLARY EMBODIMENTS

Overview and Terminology

Figure 3B:
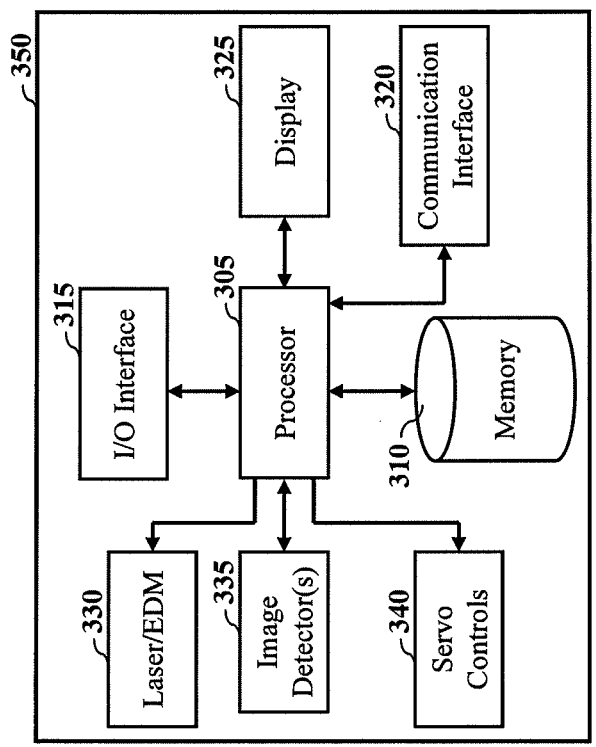
FIGS. 3A-3B depict a simplified block diagrams of devices according to one or more embodiments.

One aspect of the disclosure relates controlling operation of a surveying device based on an input contact, such as touch or stylus movement and positioning, relative to a display of image data captured by the surveying device. In one embodiment, a control device may be translate commands, such as a touch, drag, tap, stylus movement, etc., to one or more commands for controlling a pointing direction and/or imaging attribute of a surveying device. According to another embodiment, input commands may be based on contact, or touch, of a display associated with a surveying device, such as a total station. The control device may be configured to display image or video data received from the surveying device. The control device may allow for control signals to be provided to a surveying device that react directly to inputs of displayed image data. One advantage of the control functionality described herein may be improved control of a surveying device from a distance. Another advantage may be to provide precise control of a surveying device from a display screen.

In one embodiment, control of a surveying device may be based on contact and motion of a stylus relative to a display screen. Dynamic joystick functionality can translate contact with the control device to commands for the surveying device. By translating contact commands associated with the control device to commands for the surveying device, greater control of the surveying device may be provided. In addition, the control device may be configured to characterize the input commands based on one or more selected control features. As will be discussed in more detail below, control features may soften or alter the response on the surveying device to input commands, lock an axis to provide movement in another desired axis, suppress movement in an axis, and/or scale input commands based on distance to a target.

Another embodiment of the disclosure is directed to providing motion based control for controlling and/or positioning a surveying device. The motion based control, or wand functionality, as described herein may be based on motion of a control device. In one embodiment, movement of the wand may be translated for adjusting orientation of the surveying device. Wand operation may be based on determination of tilt and acceleration of the wand control, which may then be used to determine one or more control commands for the surveying device. Detection and characterization of wand motion may be translated for controlling zoom and rotating a surveying device, such as a total station, in one or more directions. Wand position may be based on position of a laser element of the surveying device.

In yet another embodiment, a device and method are provided for controlling zoom and providing aim and zoom control by a contact command associated with a display screen. A control device may be configured to toggle between one or more zoom configurations, camera selection, and/or selection of zoom areas based on input commands relative to a display screen. As will be discussed below, control of the surveying device may be based on single or multiple contact commands. Control of the surveying device may additionally be based on detection of an input with respect to a position of a display screen.

Embodiments are directed to systems including devices for controlling a surveying device. In one embodiment, a device with a display may be configured to control a surveying device, such as a total station. In another embodiment, a system may be provided including motion sensing device, such as a wand, wherein manipulation or gesturing of the wand may be employed to control the surveying device. As discussed herein, a surveying device may relate to one or more devices configured for measurement or determination of coordinates, angular measurements, positioning, and distance measurement. Although the description below refers to a surveying device as a total station or robotic total station, it should be appreciated that the methods and devices described herein may relate to surveying devices and other devices in general. In one or more embodiments, a surveying device may include a display for presenting image data, such as video data captured by one or more image detectors of the surveying device. A surveying device may additionally include one or more pointing devices, such as a laser pointer. Image data detected by a surveying device and presented by the surveying device of controller may be associated with a position of the laser pointer of the surveying device. In yet another embodiment, the control commands as discussed herein may be employed for controlling a robotic total station, or other adjustable device with respect to one or more axes.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a non-transitory medium, etc.

Exemplary Embodiments

Referring now to the figures, FIG. 1 depicts a simplified system diagram according to one or more embodiments. According to one embodiment, control device 105 may be configured to control operation of surveying device 110. Control device 105 may relate to an electronic device or portable computing device, such as a tablet. Device 105 may include display 115 configured to display a user interface for controlling one or more of control device 105 and surveying device 110. In another embodiment, display 115 may be configured to display image data, such as video data or one or more images received from surveying device 110. As depicted in FIG. 1, control device 105 may communicate by wired and/or wireless communication with surveying device 110 via communication path 125. In certain embodiments, display 115 may provide a control screen to control operation of the surveying device.

Surveying device 110 may be configured for determination and measurement of one or more of angular offset, height, length, distance, and coordinate determination. Surveying device may additionally be configured for controlled aim, pointing, imaging, performing stake out measurements, projection of planes, 3D projections, and providing electronic distance measurements. In that fashion, surveying device 110 may be employed for use in one or more of surveying, engineering, and construction. Surveying device 110 may include display 120 configured to display a user interface, image data detected by surveying device 110. In certain embodiments, display 120 may provide a control screen to control operation of the surveying device. Display screen 120 may be touch sensitive. In certain embodiments, either of display 115 and display 120 may be optional. Surveying device 110 may include one or more elements for projections, including projection of 3D points. As depicted in FIG. 1, control device 105 and surveying device 110 each including a display. However it should be appreciated that in certain embodiments, control device 105 may be integrated with surveying device 110.

As will be discussed herein, elements of system 100 may be configured to provide precise control of surveying device 110 and overcome one or more drawbacks of conventional devices and methods. By way of example, system 100 may be configured to provide devices and methods for controlling, aiming, or pointing of surveying device 110 based on touch or stylus inputs to a display, such as display 115 or display 120. Translating contact with a display may be generally referred to as dynamic joystick functionality. According to another embodiment, control of surveying device 110 may be based on motion of control device 105, wherein control device 105 relates to an electronic device configured to sense and translate motion or gestures. This functionality is discussed below as wand functionality. In yet another embodiment, control of surveying device 110 may be based one or more commands detected based on contact with a display screen for adjusting zoom and/or position. These functions are discussed below as smart zoom functionality below. It should be appreciated that these features may be provided by single control device according to one or more embodiments, such as either of control device 105 or surveying device 110.

Referring now to FIG. 2, a process is depicted for controlling a surveying device according to one or more embodiments. Process 200 may be employed by a device (e.g., control device 105) to control a surveying device (e.g., surveying device 110) according to one or more embodiments.

Process 200 may be initiated by displaying a control screen at block 205. The control screen may include image data captured by the surveying device, such as a series of still images or video data. The image data may relate to an area that a surveying device is aimed. Image data associated with the orientation of the survey device may be displayed on a touch screen. The control device and/or surveying device may be configured to store image data displayed by the control screen. Process 200 is described with respect to a control screen of a control device; however, it may be appreciated that a control device of a surveying device may function in a similar manner.

At block 210, the control device may be configured to detect an input associated with the control screen. In one embodiment, the input may be based on contact with the control screen by one or more of a tap command, series of taps, drag command or movement relative to the control screen. The input may be based on user touch or contact with the control screen by a stylus or other input device. In certain embodiments, the input may be based on motion of the control device, such as a tilt or acceleration of the control device with respect to one or more axes. Other motion inputs may relate to gesture based commands or commands relative to an initial reference position of the control device. Control inputs may be generated based on a reaction to direct input of display image data.

At block 215, the control device may determine a control command for the surveying device based on the input associated with the control screen. The control command may be determined based on tracking motion of contact with the control screen, such as by a tracking routine. The control command may adjust the position (e.g., orientation, aim, angular rotation, etc.) of the surveying device based on characteristics of the input command. The control command may be a translation of contact with the control screen to control movement of the surveying device. For example, a drag command may relate to rotation of the surveying device in one or more of horizontal and vertical directions. According to one embodiment, the control command detected at block 215 may be generated based on one or more features to allow for greater control of the surveying device. The control command may be based on a sensitivity mode wherein the control device is configured to adjust the position of the surveying device relative to half the distance of the input. Alternatively, or in combination, the control command may adjust the surveying device in a direction opposite to the input command. The control command may ignore movement of the input command with respect to an axis or suppress movement in the one axis (e.g., a vertical axis) relative to another axis (e.g., a horizontal axis). In another embodiment, the control command can scale the movement of the input command based on a distance measurement performed by the surveying device. Input commands may be processed or determined based on characteristics of the inputs.

In one embodiment, process 200 may determine a control command by initiating tracking routine of the input command based on contact to the control screen. The tracking routine may be performed while the input (e.g., user touch or stylus), is in contact with the control screen. The control device may update the display of the control screen based on image data received from the surveying device following the control command.

At block 220, the control device can control operation of the surveying device based on the control command. The surveying device may be configured to reorient, such as rotate in one more of a horizontal and vertical direction. Alternatively, or in combination, a surveying device may modify a zoom setting based on the control command. Control of the surveying device allows for seamless change of image data on the control screen. Control may be tied to input movement. For continuous moment, the surveying device may be controls to re-orient based on the amount and speed of the input. In that fashion, the control device may set the speed and amount of rotation.

Figure 3A:
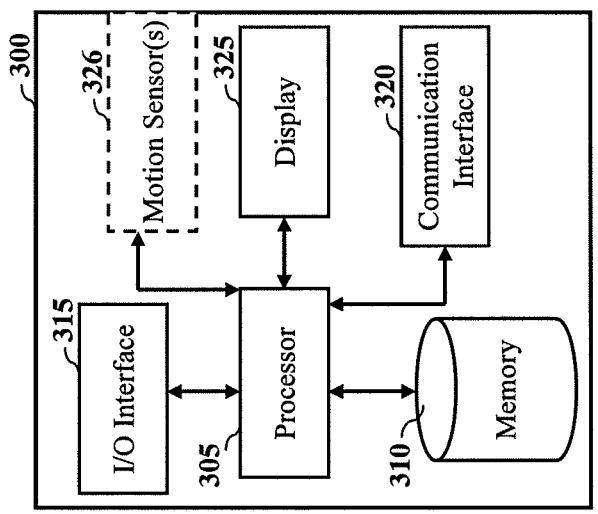

Referring now to FIGS. 3A-3B, simplified block diagrams are depicted of device configurations according to one or more embodiments. Referring first to FIG. 3A, a simplified block diagram is depicted of a control device. Device 300 may be configured to provide one or more of directional, motion or control commands to a surveying device, such as a total station. In certain embodiments, device 300 relates to control device 105 of FIG. 1. Device 300 may be configured to execute an application for communicating with or controlling operation of a surveying device (e.g., surveying device 110). Device 300 may be one or more of a display device, communication device, survey controller, mobile device, tablet, computing device, or electronic device in general.

As depicted in FIG. 3A, device 300 includes processor 305, memory 310, input/output (I/O) interface 315, communication interface 320, display 325 and detection module 330. Elements of device 300 may be configured to communicate and interoperate with processor 305 by a communication bus. Processor 305 may be configured to control operation of device 300, or another device, based on one or more computer executable instructions stored in memory 310. In one embodiment, processor 305 may be configured to detect an input associated with a control screen and control operation of a surveying device. Memory 310 may relate to one of RAM and ROM memories and may be configured to store one or more files, and computer executable instructions for operation of device 300. Although depicted as a single memory unit, memory 310 may relate to one or more of internal device memory and removable memory. Memory 310 may store image data, zoom positions, selected targets and stylus movements.

Input output (I/O) interface 315 may be configured to output data and/or commands to one or more output devices. According to one embodiment, I/O interface 315 may be configured to receive one or more user commands. I/O interface 315 may include one or more buttons to control operation of device 300 including controlling selection of content for display and controlling operation of device 300. Input buttons of I/O interface 315 may include one or more buttons for user input, such as a such as a numerical keypad, volume control, menu controls, pointing device, track ball, mode selection buttons, and survey functionality (e.g., coordinate measurement, angular measurement, marking, aiming, etc). Input buttons of I/O interface 315 may include hard and soft buttons, wherein functionality of the soft buttons may be based on one or more applications running on device 300.

Communication interface 320 may include one or more elements to allow for communication by device 300 by wired or wireless communication. Communication interface 320 may include one or more ports for receiving data, including ports for removable memory. Communication interface 320 may be configured to allow for network based communications including but not limited to LAN, WAN, Wi-Fi, etc.

In certain embodiments, device 300 may include display 325 to display image data, such as video data and graphics data, alert messages, and display one or more applications executed by processor 305. By way of example, display 325 may be configured to display video image data detected by a surveying device. Display 325 of device 300 may be configured to display one or more of a user interface, and image data detected by an image detector of a surveying device. In certain embodiments, display 325 may be a touch screen configured to detect contact, dragging, tap(s), and/or stylus operation. In that fashion, display 325 may be a control screen. Display may be configured to identify projection points of a 3D data.

Device 300 may optionally include one or more motion sensors 326. In certain embodiments, motion of device 300 may be detected to control operation of a surveying device. Motion sensors 326 may be configured to detect and characterize motion of the control device, such as a wand, and determine one or more commands for operating a surveying device. In certain embodiments, motion sensors 326 may be configured to detection motion relative to a horizontal axis and vertical axis. Motion sensors 326 may include one or more of an accelerometer, gyroscopic sensor, single axis sensors and multiple axis sensors.

Referring now to FIG. 3B, a simplified block diagram is depicted of a surveying device, according to one or more embodiments. In certain embodiments, device 350 relates to surveying device 110 of FIG. 1. Device 350 may be configured to provide an application for communicating with a control device (e.g., control device 105) or controlling operation of the surveying device. Elements of device 350 may function similarly to elements of device 300 described above. Device 350 may be configured to receive one or more directional, motion or control commands for control.

According to one embodiment, communication interface 320 may be configured for communication with one or more control devices (e.g., control device 105). For example, in one embodiment, communication interface 320 may be configured to receive directional commands from the control device. Device 350 may be configured to translate the received directional command to control operation of surveying device, such as rotation, zoom, repositioning, setting aim, pointing the device, etc. In other embodiments, communication interface 320 may be configured to receive control commands for controlling operation of device 350.

Display 325 of device 350 may be configured to display one or more of a user interface, cross hairs, and image data detected by an image detector of device 350. In certain embodiments, display 325 may be a touch screen configured to detect contact, dragging, tap(s), and/or stylus operation. In that fashion, display 325 may be a control screen on a surveying device.

Laser/electronic distance measuring (EDM) module 330 of device 350 may be configured for pointing the surveying device and electronically measuring distance from the surveying device to a measurement position. In certain embodiments, a laser generated by module 330 may be focused for increased visibility. A laser generated by module 330 may be employed for aiming surveying device 350.

According to one embodiment, surveying device 350 may include one or more image detectors depicted as 335. Image detectors 335 may relate to one or more cameras or imaging devices configured to detect image or video data. Image detectors 335 may allow for a plurality of focal lengths to provide a plurality of zoom levels. Zoom levels of the imaging devices 335 may be based on one or more inputs associated with a control screen of a control device.

Surveying device 350 may include servo controls 340 configured to rotate the surveying device camera and/or pointer relative to a horizontal axis and vertical axis. Servo controls may be configured to adjust position of surveying device 350 relative to tracking of inputs to a control device. In certain embodiments, servo controls may mimic or translate received inputs of a control screen by adjusting the aim or orientation of surveying device 350.

Dynamic Joystick Functionality

According to one embodiment, a system and methods may be provided for controlling aiming or pointing of a surveying device based on touch or stylus inputs to a display, such as a control screen. These functions are generally referred to as dynamic joystick functionality. Dynamic joystick functionality may be accessible during surveying device setup and during data collection. Dynamic joystick functionality may incorporate one or more of the features described herein with respect to the wand and smart zoom functionalities.

Figure 4B:
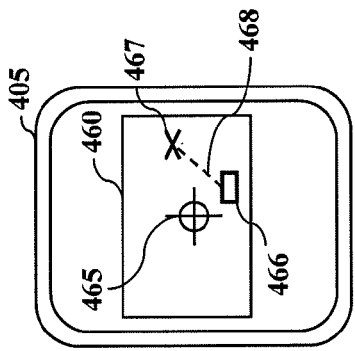
FIGS. 4A-4D depict graphical representations of translating input associated with a control screen to commands for a surveying device according to one or more embodiments.
Figure 4C:
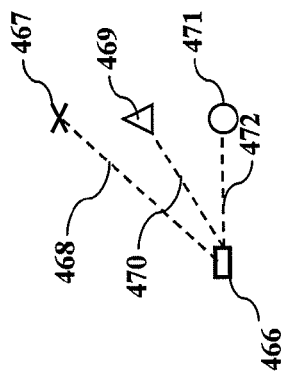
Figure 4A:
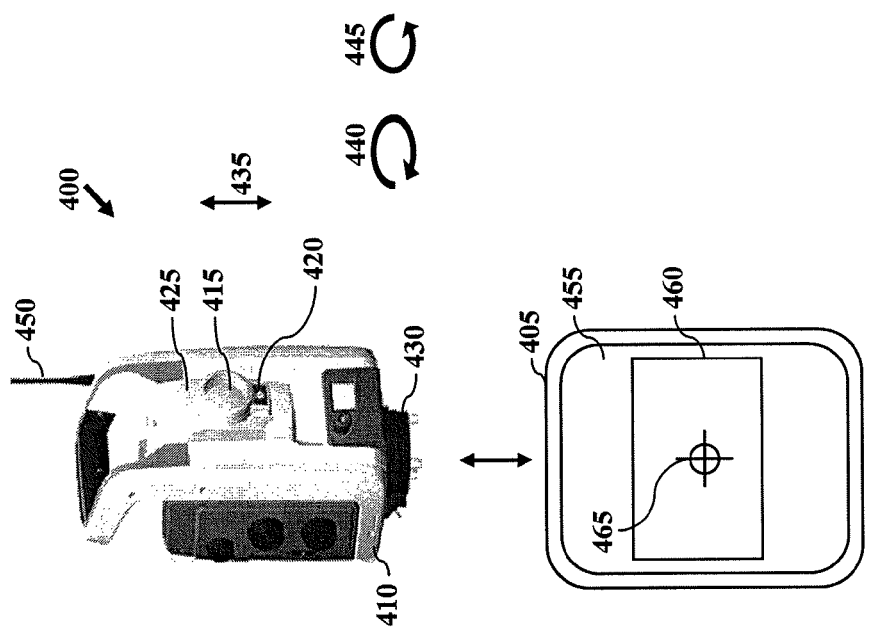

Referring now to FIGS. 4A-4D, graphical representations are depicted of translating a control screen input to commands for a surveying device. Referring first to FIG. 4A, a graphical representation is depicted of system 400 including control device 405 and surveying device 410. Control device 405 may be configured to communicate with surveying device 410 by wired or wireless communication depicted as 406. Surveying device 410 is depicted as a total station including imaging device 415, laser module 420, vertical adjustment 425, and horizontal adjustment 430. Surveying device 410 may additionally include antenna 450 for receiving and transmitting control data. In certain embodiments, imaging device 415 of surveying device 410 may include more than one camera for capturing still and video image data.

Control device 405 may include display panel 455. At least a portion of display panel 455 may present control screen 460 including image or video data received from surveying device 410. Control screen 460 may display one or more user interface elements such as crosshairs 465. Crosshairs 465 may overlay image data to identify a position of a laser pointer of surveying device 410. According to one embodiment, dynamic joystick functionality may be provided to allow for a user of control device 405 to precisely point surveying device 410, a laser of surveying device 410, and control camera zoom. Based on detection of an input command, control device 405 may transmit one or more commands to rotate surveying device 410 horizontally, as shown by directions 440 and 445, and/or vertically, as shown by direction 435. Dynamic joystick functionality may additionally provide one or more control features for translating contact position and speed of surveying device commands.

FIG. 4B depicts a graphical representation of an input associated with control screen 460. According to one embodiment, control screen 460 may be displayed based on activation of a visualization button on control device 405 or surveying device 410. Display of control screen 460 may initialize dynamic joystick operation. Similarly, contacting control screen 460 via touch or a stylus may initialize a tracker routine to convert user inputs to instrument commands. Dragging a stylus across control screen 460, which may display image data or map data, can generate one or more commands for adjusting the horizontal or vertical position of surveying device 410. Lifting the stylus, or contact, may deactivate the tracker routine.

Contact of control screen 460, as depicted by 466, may be detected by control device 405. When contact 466 is initiated, control device 405 may initiate a tracking routine to determine the end point, shown as 467 and input path 468. Based on one or more of contact 466, end point 467 and input path 468, the control device may determine a control command for operation of surveying device 410, such as rotation or repositioning of surveying device 410. Contact 466 and/or input path 468 may be detected based on use of a stylus, or detection of user contact of control screen 460. By detecting an input, or contact, with respect to control screen 460 and displaying image data detected by surveying device 410, control device 405 may precisely point surveying device 410 based on the displayed image data.

According to one embodiment, dynamic joystick functionality may provide one or more features to translate input position and path to surveying device commands. The basic movement and control of the dynamic joystick functionality may be enhanced by one or more features, including but not limited to a sensitivity mode, invert vertical axis mode, axis lock mode, suppressed vertical axis mode, and distance scaling mode. Referring now to FIG. 4C, a graphical representation is depicted of joystick functionality features for additional contact 466, end point 467, and input path 468. Contact points may be imitated anywhere on screen for a drag movement.

According to one embodiment, a sensitivity mode can allow a user to select a coarse or fine adjustment. In the fine mode, surveying device 410 may be configured to move at roughly half the distance relative to a coarse mode for the same distance traveled by the stylus, or input contact. The fine mode may allow for more precise control for pointing a laser of surveying device 410, while the coarse mode may allow for quick positioning of the laser in an area of interest. Thus, by way of example, input path 468 in a fine mode may control surveying device to be repositioned to a smaller distance relative to repositioning in a coarse mode.

According to one embodiment, a suppressed vertical axis mode may result in reduced movement with respect to one axis input movement. For example, movement in the vertical axis of an input command may be reduced relative to movement in the horizontal axis. As depicted in FIG. 4C, input path 468 detected by a control device may result in terminal point 469 with path 470 based on a suppressed vertical axis mode. When the suppressed vertical axis mode is activated, surveying device 410 will move a laser roughly half the distance in the vertical axis relative to motion in the horizontal axis for the same movement. This feature may be employed to overcome the effects of using a laser at an angle to a surface such as a ceiling or floor when a small movement in the input, or stylus, translates to a large movement across the surface.

FIG. 4C also depicts an axis lock mode. According to one embodiment, an axis lock mode allows an axis to be locked in either the horizontal or vertical direction. When an axis is locked, movement of the input for the unlocked axis is ignored. As depicted in FIG. 4C, input path 468 detected by a control device may result in terminal point 471 with path 472 based on a locked vertical axis.

Figure 4D:
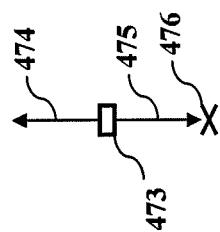

According to one embodiment, invert vertical axis mode can allow for a user to move a stylus, or present an input command, in the up direction that will cause the laser pointer and aim of the surveying device to move in a down direction, or vice versa. The invert vertical axis mode may be toggled on or off by a user. As depicted in FIG. 4D, starting point 473 and input path 473 detected by a control device may result in terminal point 476 with path 475 based on an invert vertical axis mode.

According to one embodiment, distance scaling mode allows for a distance measuring capability of surveying device 410 to scale inputs received on control screen 460. For example, the farther away a surface is from surveying device 410, the less sensitive control device 405 may be to inputs, such as stylus inputs. As a result, movement of a laser of surveying device 410 relative to an input, such as a stylus, may be more consistent at varying distances. According to one embodiment, the distance scaling mode may only operate when a surveying device is in tracking mode.

Figure 5:
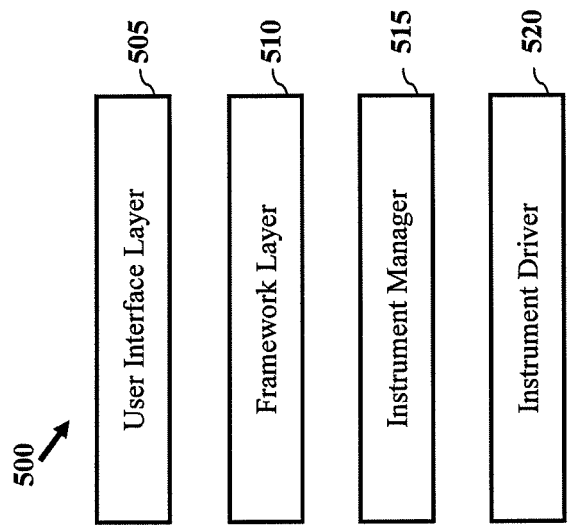
FIG. 5 depicts a graphical representation of dynamic joystick functionality according to one or more embodiments.

Referring now to FIG. 5, a graphical representation is depicted of dynamic joystick functionality according to one or more embodiments. FIG. 5 depicts layers of the dynamic joystick functionality for handling inputs and interfacing with devices. According to one embodiment, dynamic joystick functionality may include user interface layer 505 to address user inputs and initialization of routines. Interface layer 505 may allow a tracking routine to be initiated and terminated. Framework layer 510 may provide core algorithms for coding and overall function of a control device and surveying device. Instrument manager layer 515 may provide an interface for instrument drivers, wherein instrument driver layer 520 controls instrument operation. In certain embodiments, instrument driver 520 may, or may not, be provided on a control device.

Figure 6A:
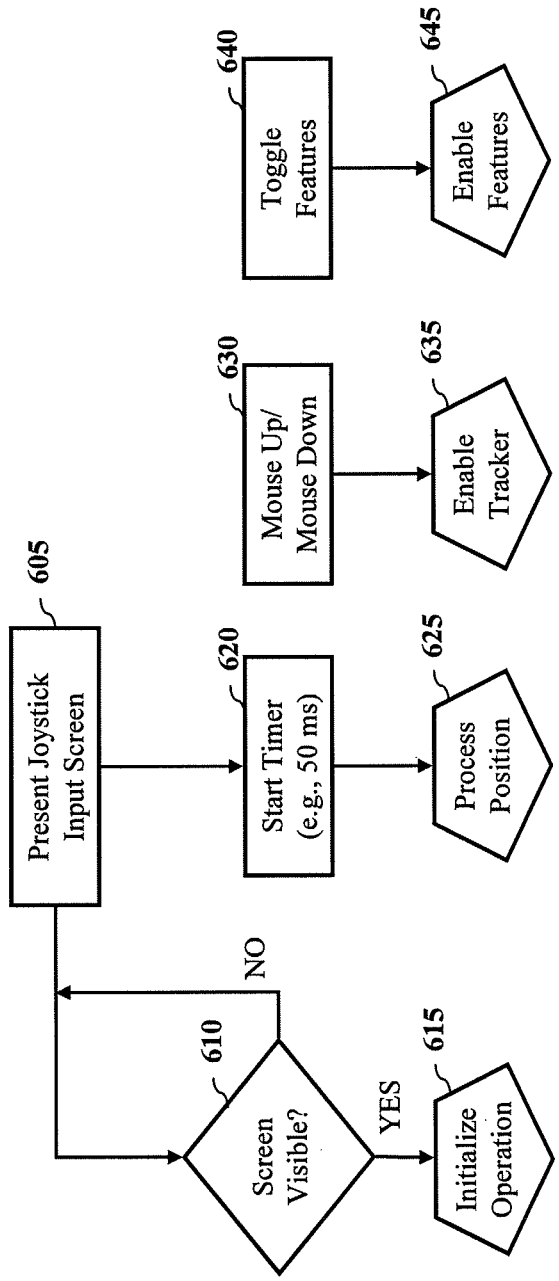
FIGS. 6A-6C depict graphical representations of dynamic joystick functionality according to one or more embodiments.
Figure 6B:
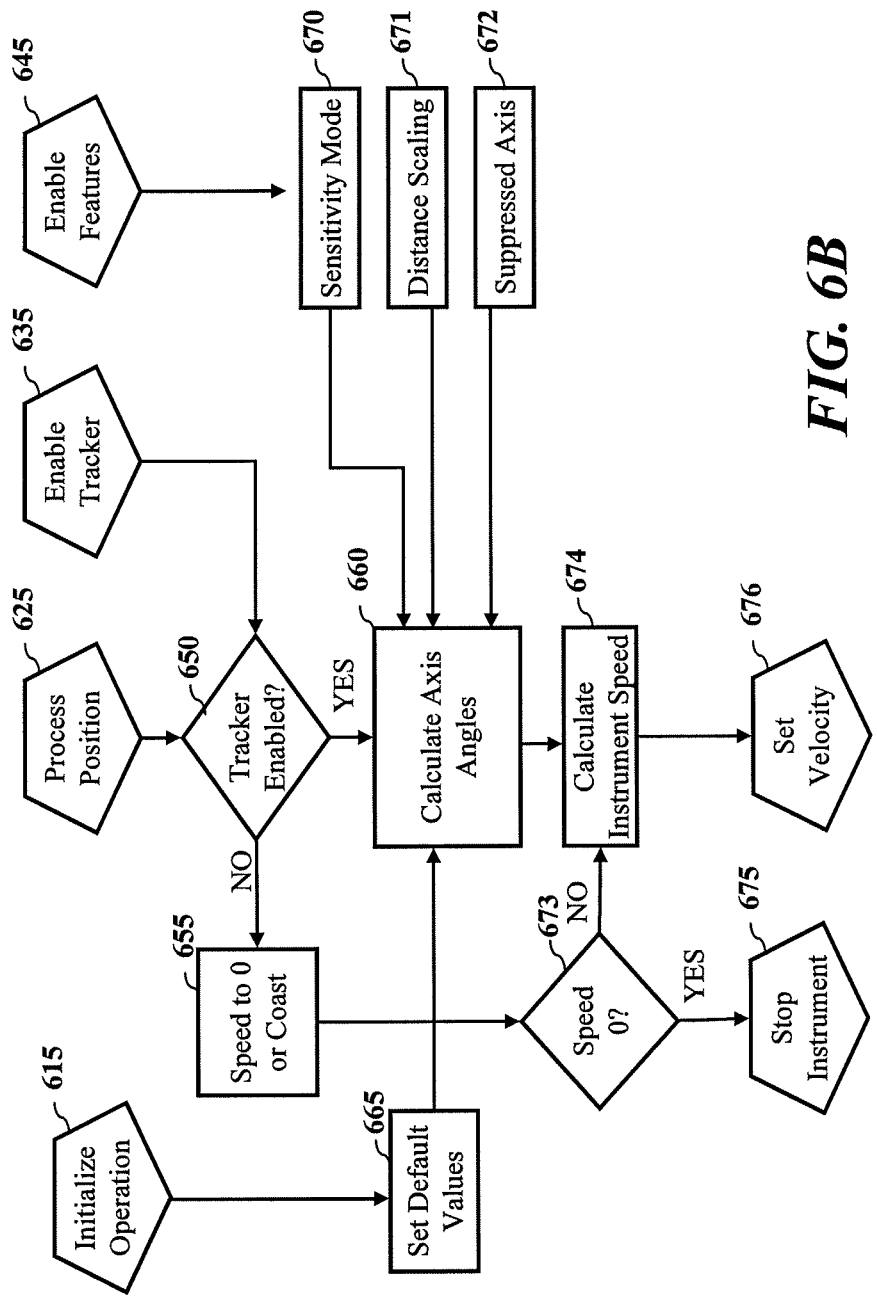
Figure 6C:
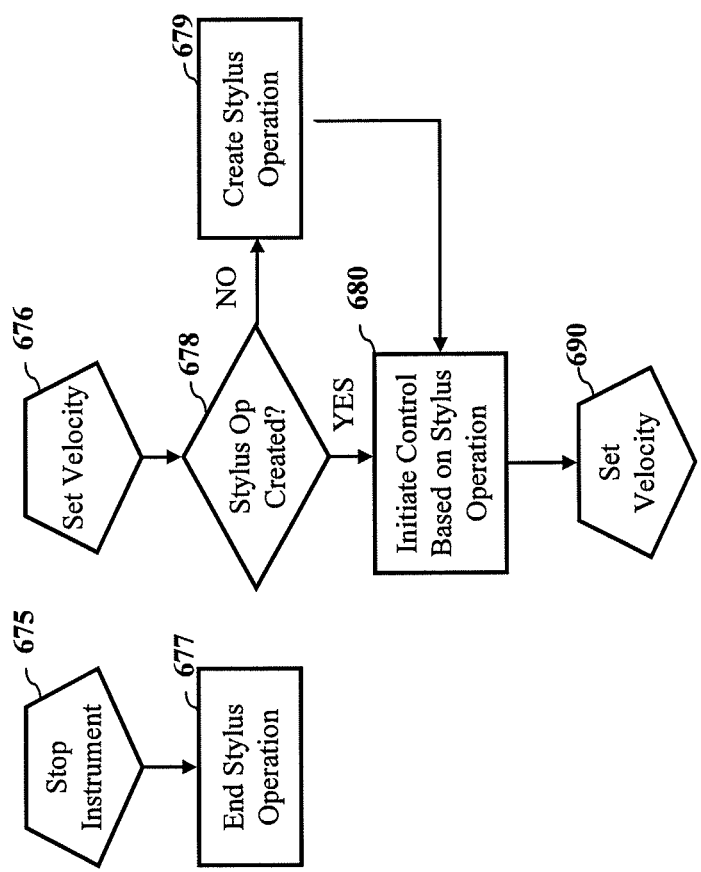

FIGS. 6A-6C depict graphical representations of dynamic joystick functionality according to one or more embodiments. According to one embodiment, the functions described in FIGS. 6A-6C may be performed by an application of a control device and/or surveying device. Referring first to FIG. 6A, dynamic joystick functionality may be initiated during presentation of a joystick input screen or control screen at block 605. FIG. 6A depicts functionality associated with the initial detection of an input to a control screen. The input may be based on video or image data displayed by a device, such as a control device.

At decision block 610, screen visibility may be checked to determine if image data is displayed by a control screen. When image data is not displayed (e.g., "NO" path out of decision block 610), the dynamic joystick functionality continuously checks for screen display. When image data is displayed (e.g., "YES" path out of decision block 610), such as video data associated with a surveying device and/or laser location, operation of the dynamic joysticks operation is initialized. The functionality may allow for detecting input to a control screen, such as contact of a stylus or touch. Based on a detected input, a control device may start a timer (e.g., 50 ms) at block 620 to determine an initial position of an input (e.g., stylus contact, tap, etc.) at block 625. The dynamic joystick functionality may also allow for detection of a mouse or scrolling command in the up or down direction at block 630 relative to a control screen and enabling a tracker routine at block 635. Based on one or more user selections, features such as a sensitivity mode and distance scaling, may be toggled at block 640 and enabled at block 645.

Referring now to FIG. 6B, dynamic joystick functionality is depicted for translating a detected input to commands for a surveying device. Functionality to initialize operation at block 615, process position at block 625, enable a tracking routine at block 635, and enable features at block 645 may be employed for generating commands for a surveying device. Based on position processed at block 625 and a tracking routine enabled at block 635, the control device may check if the tracker is enabled for the detected input at decision block 650. When the tracking routine is not enabled (e.g., "NO" path out of decision block 650), the control device checks if the input has a speed of zero or is coasting. When the tracking routine is enabled (e.g., "YES" path out of decision block 610), the control device can calculate axis angles for a desired position of a surveying device at block 660. Calculating angles for the surveying device at block 660 may be based on default values set for a surveying device at block 665, and one or more features such as sensitivity mode at block 670, distance scaling at block 671, and a suppressed axis at block 672. The set default values of block 665 may be based on a particular starting position or aim for the surveying device. Based on calculated axis angles at block 660, the control device may calculate a desired instrument speed a block 674. The calculated instrument speed at block 674 may be based on the speed or other characteristics of an input to a control device. In addition, the calculated instrument speed may be based on a determination at decision block 673 that the speed of the input is not zero (e.g., an input such as a stylus is dragged or moved across at least a portion of the control screen). Based on a calculated instrument speed at block 674, the control device may generate a command for the surveying device to initiate motion and set the velocity at block 676. When decision block 673 determines that the speed of the input is zero, the control device may send a command to stop the instrument at block 675.

FIG. 6C depicts functionality for terminating or continuing instrument motion according to one or more other embodiments. Based on a determination at block 675 to stop motion of the surveying instrument, stylus operation may be terminated at block 677. By way of example, the control device may cease the tracking routine of a particular input. Following the termination of stylus operation at block 677, the control device may initiate another adjustment by detecting an input or contact to the control screen. According to another embodiment, the control device may allow for controlling movement of the surveying device to mimic or translate input commands of the control screen. Once the velocity of the surveying device has been set at block 676, the control device may check to determine if stylus operation has been created at block 678. Stylus operation may allow for continuous motion of the surveying device based on motion of the stylus with respect to the control screen. When the stylus operation has not been created (e.g., "NO" path out of decision block 678), stylus operation may be created at block 679. When the stylus operation has been created (e.g., "YES" path out of decision block 678), the control device can perform stylus operation at block 680 by detecting the motion of the stylus with respect to the control device and adjusting the surveying device aim with a determined velocity at block 690.

Figure 7:
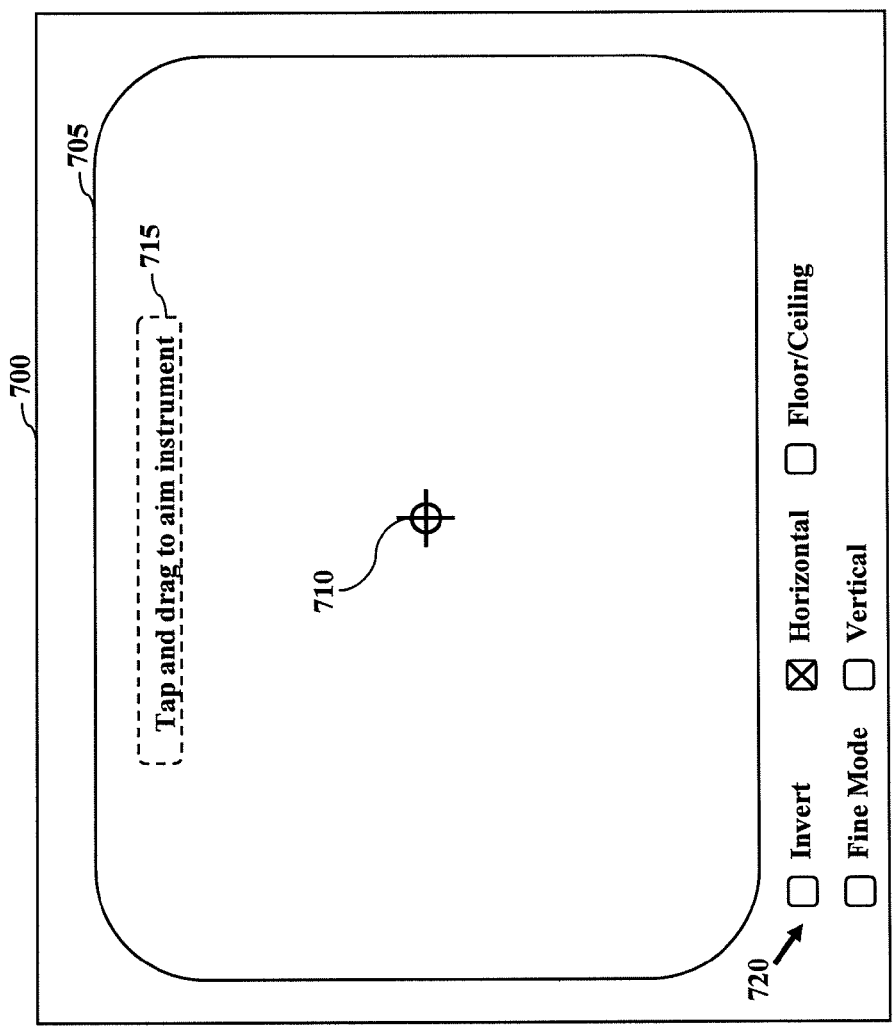
FIG. 7 depicts a graphical representation of dynamic joystick control screen according to one or more embodiments.

FIG. 7 depicts a graphical representation of dynamic joystick control screen according to one or more embodiments. In one embodiment, control screen 700 may be displayed by one a control device (e.g., control device 105). In another embodiment, control screen 700 may be displayed by a surveying device (e.g., surveying device 110). Control screen 700 may include display window 705. Display window 705 may include image and/or video data captured by a surveying device based on the measurement area associated with a laser of the surveying device. Cross hairs 710 may identify the position of a laser of the surveying device and may be overlaid on image data in display window 705. A control device may be configured to detect an input to display window 705, such as a touch command, stylus command, tap or drag. In certain embodiments, control screen 700 may include display of message 715 to provide notice to a user that the device is ready to a dynamic joystick command.

Control screen 700 may include feature boxes 720 to allow a user to toggle one or more features of the dynamic joystick functionality. By checking a box, such as a horizontal axis lock box, the control device may be configured to suppress the motion of the surveying device in each of the unselected axes based on a detected input command.

Wand Functionality

Wand functionality may provide control of a surveying device based on motion of a control device. The control device may relate to an electronic device having a display and may include motion sensing elements. Wand functionality may incorporate one or more of the features described herein with respect to the dynamic joystick and smart zoom functionalities.

Referring now to FIGS. 8A-8C, graphical representations are depicted of wand functionality. FIG. 8A depicts a simplified system diagram of wand functionality according to an exemplary embodiment. Control device 805 may be configured to transmit a control command for controlling operation of surveying device 810 according to one or more embodiments. Control device includes display area 815, which may be configured to detect touch screen commands or inputs from a stylus. In certain embodiments, wand functionality may be initiated by a user contacting button 820 of the control device or a particular portion of display area 815, for example area 825. A wand command may then be entered while the button is depressed of following activation of the button. As depicted in FIG. 8A, control device 805 may be moved up (e.g., direction A in FIG. 8A), down (e.g., direction B in FIG. 8A), left (e.g., direction C in FIG. 8A), or right (e.g., direction D in FIG. 8A). One or more of the movements may be translated by the control device to a control command for turning or adjusting aim of surveying device 800. In an exemplary embodiment, moving control device 805 up (e.g., direction A in FIG. 8A) may translate to a control command to move the camera of the surveying device up, and similarly moving control device 805 down (e.g., direction B in FIG. 8A) moves the camera down. Moving control device in a horizontal direction may translate to a control command for rotating the surveying device in a horizontal direction. For example, left (e.g., direction C in FIG. 8A) rotates surveying device counter-clockwise, and right (e.g., direction D in FIG. 8A) may rotating the device clockwise.

According to another embodiment, wand functionality may be provided by a control device without a display, such as a wand or control device. FIG. 8B depicts a graphical representation of a control device as a wand, wherein motion of the wand may be detected and translated to one or more commands for surveying device 810. A control device may be repositioned as depicted in FIG. 8B, from position 830 to position 835. Repositioning as depicted in FIG. 8B may relate to horizontal motion (e.g., direction D in FIG. 8A). In certain embodiments, the motion of the wand may be detected when button 836 of the wand device is activated, or for a period of time following activation. FIG. 8C depicts repositioning form position 840 to position 845 which may relate to vertical motion (e.g., direction A in FIG. 8A).

Figures 9A, 9B:
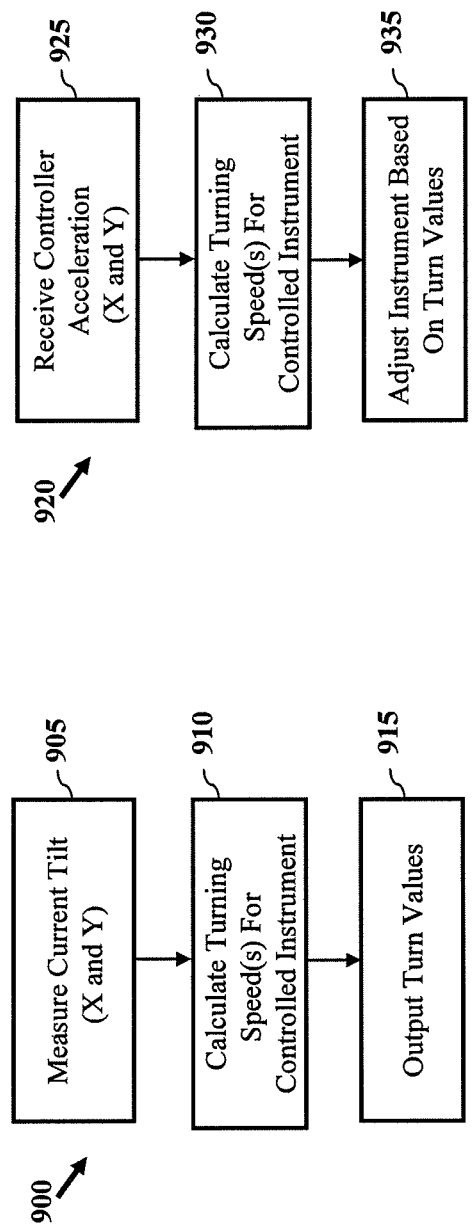
FIGS. 9A-9D depict one or more processes for providing wand functionality according to one or more embodiments.

FIGS. 9A-9D depict one or more processes for providing wand functionality. Referring first to FIG. 9A, a process is depicted for output of a control command. Process 900 may be initiated by measuring a current tilt of the control device (e.g., Control device 805) in the x and y directions (e.g., directions A-B, and C-D, respectively) at block 905. Following a gesture of command by the user, such as motion depicted in any of FIGS. 8A-8C, the control device may calculate turning speeds for a controlled instrument (e.g., surveying device 810) at block 910. According to one embodiment, the surveying device may be configured to turn at one or more turning speeds. In certain embodiments, a user may select from two or more turning speeds. The control device may output the turn values to the surveying device at block 915.

FIG. 9B depicts a process for adjusting a surveying device (e.g., surveying device 810). Process 920 may be initiated by receiving controller acceleration values in the horizontal and vertical directions (e.g., directions A-B, and C-D, respectively) at block 925. The surveying device may then calculate turning speeds at block 930. The surveying device may then adjust the position or aim of the instrument based on the turn values at block 935. Mapping between tilted and acceleration values in processes 900 and 920 can be calibrated to allow for instrument turning depending on one or more features of the dynamic joystick module including a sensitivity mode, invert vertical axis mode, axis lock mode, suppressed vertical axis mode, and distance scaling mode.

Figures 9C, 9D:
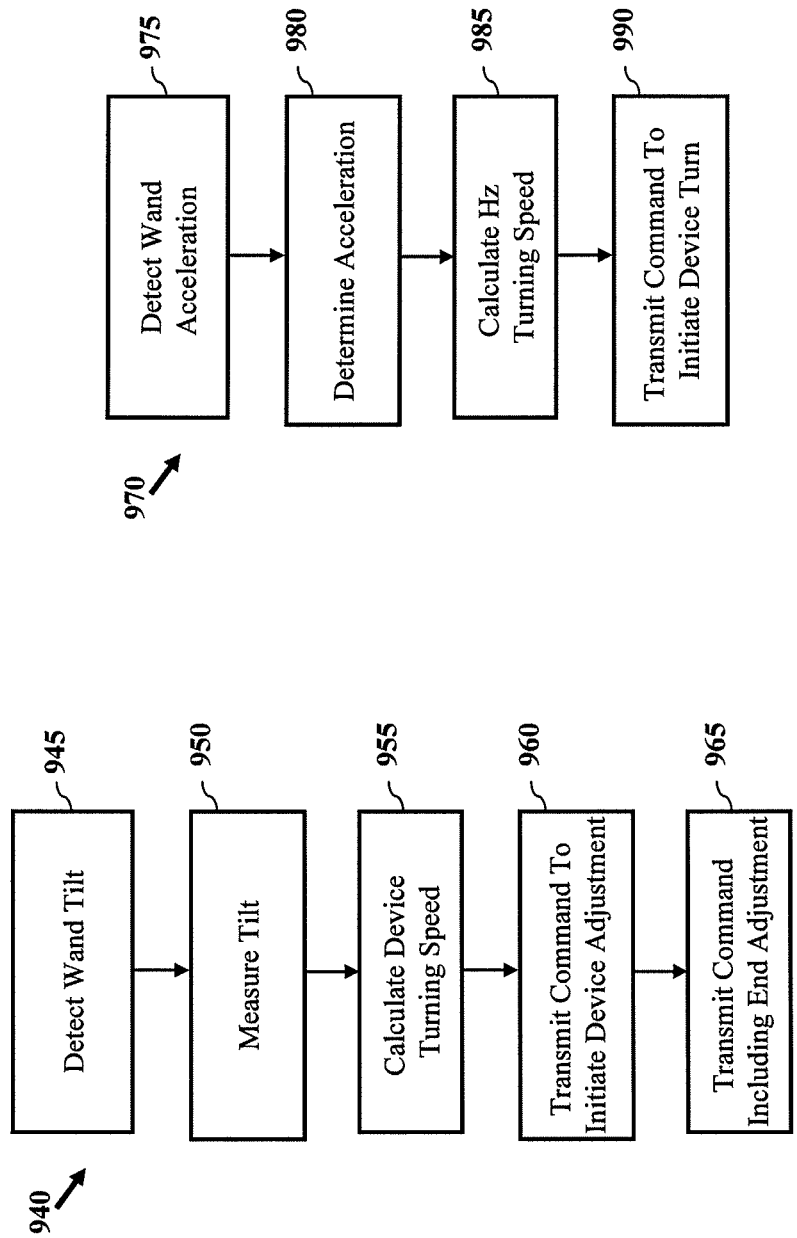

FIG. 9C depicts a process for output of a control command by a control device (e.g., control device 805). Process 940 may be initiated by detecting wand tilt at block 945, the wand tilt relating to an initial reference position. The control device may then measure tilt of an input command at block 950 and calculate turning speed of a surveying device at block 955 based on the measured tilt. The control device may then transmit the command to the surveying device to initiate device adjustment at block 960. The control device may transmit a command including an end adjustment command at block 965 when user motion of the control device has terminated.

FIG. 9D depicts a process for output of a control command by a control device (e.g., control device 805). Process 970 may be initiated by detecting wand acceleration at block 975, the wand acceleration relative to one or more axes. The control device may then determine acceleration of input command at block 980 and calculate frequency of a turning speed at block 985 based on the determined acceleration. The control device may then transmit a command to the surveying device to initiate device turning at block 990, wherein the surveying device may turn according to the determined direction and calculated speed.

Smart Zoom Functionality

In yet another embodiment, control of a surveying device may be based one or more commands detected based on contact with a display screen for adjusting zoom and/or aim position. Control of the surveying device by a video screen for controlling zoom and instrument turning may be provided by smart zoom functionality. Smart zoom functionality may incorporate one or more of the features described herein with respect to the dynamic joystick and wand functionalities.

Smart zoom functionality may provide a zoom control by one or more of zoom-in by an input and zoom-out by an input, wherein the input may be a contact command. The zoom control can also allow for zooming-in to the full extent of the surveying device by an input, and zooming-out to the full extent of the surveying device by an input. According to one embodiment, smart zoom functionality may allow for detection of one or more input clicks or taps on a control screen and controlling a surveying device based on the number of clicks or taps and the position the clicks or taps are detected on the control screen.

According to one embodiment, the smart zoom functionality may react to direct input to an image displayed by a control device to aim crosshairs and/or imaging device of the surveying device. Smart zoom may also allow for providing a zoom between one or more imaging devices, to change an optical zoom level, and change a digital zoom level. The smart zoom functionality may also be configured to react to a combination of aim and zoom commands. According to one embodiment, aim and zoom commands may be provided using the same input capabilities of the control device. For example, contact of a control screen by user touch or a stylus may provide one or more of an aim command, zoom command, and camera switch command.

Figure 10A:
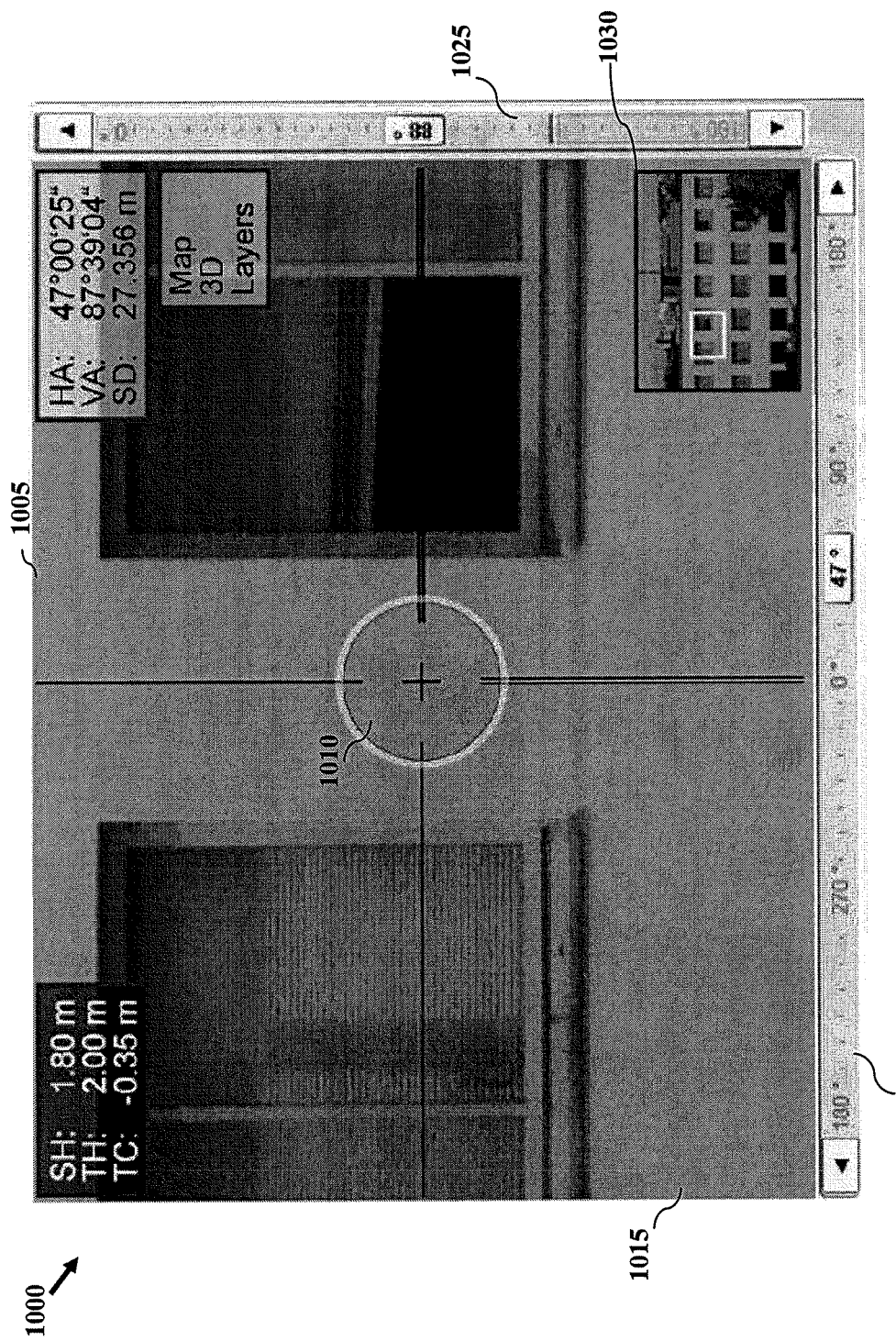
FIGS. 10A-10C depict graphical representations of a control screen and smart zoom functionality according to one or more embodiments.
Figure 10B:
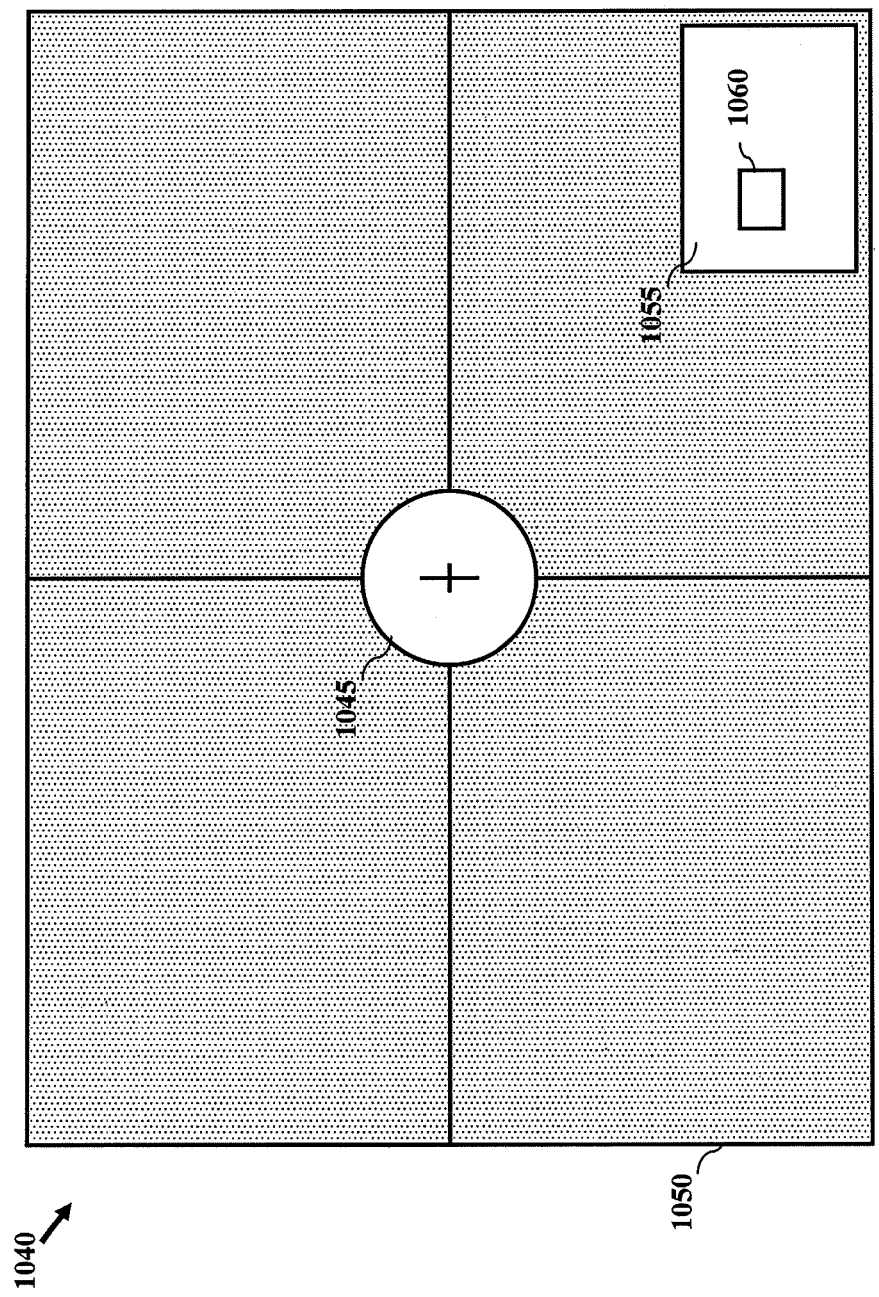
Figure 10C:
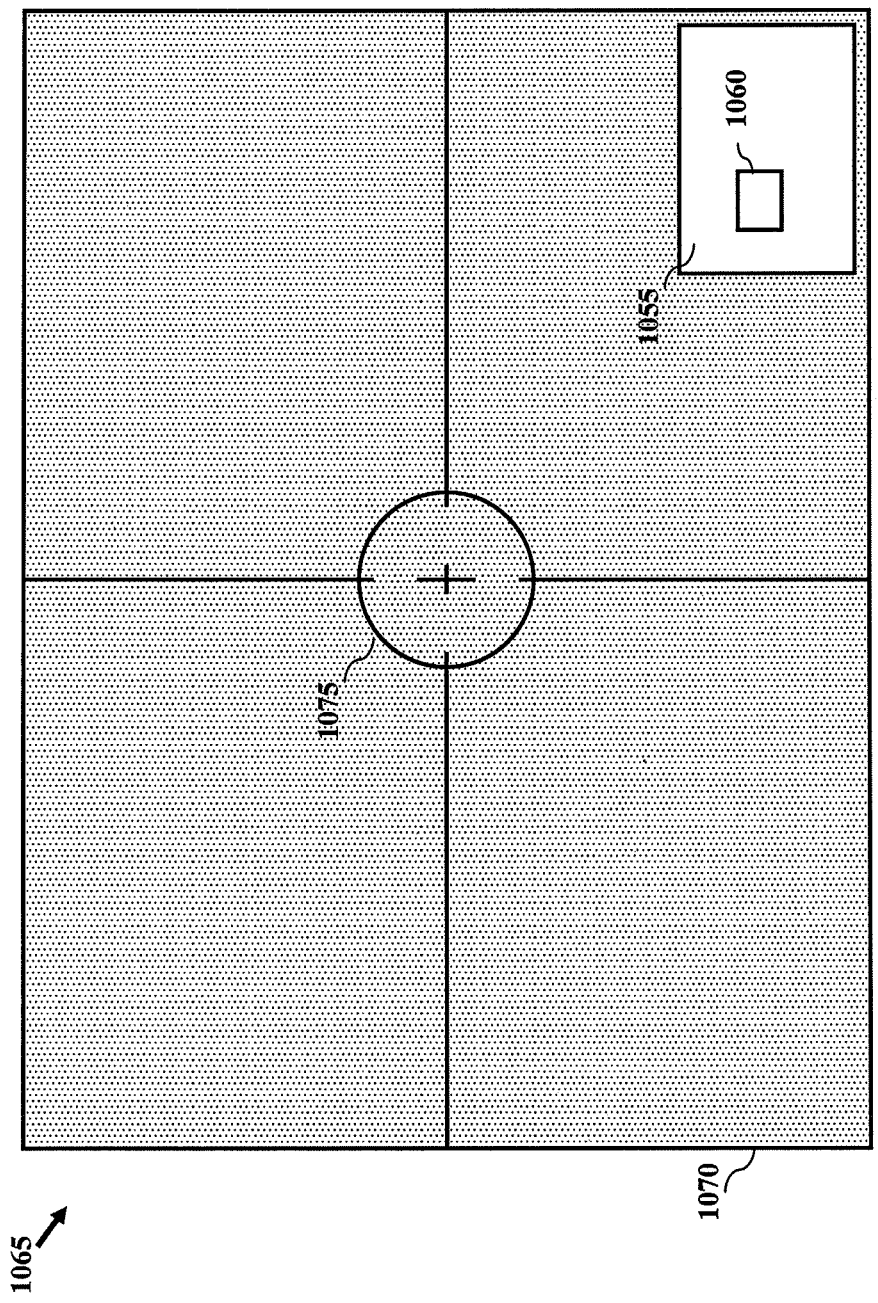

Referring now to FIGS. 10A-10C, graphical representations are depicted of a control screen and smart zoom functionality. FIG. 10A depicts a graphical representation of control screen display 1005. Control screen display 1000 may include presentation of image data 1005 captured by a surveying device. According to one embodiment, smart zoom functionality may allow for a user to navigate to one or more zoom stages based on input to one or more portions of control screen display 1005. In one embodiment, inner circle 1010 may relate to a zoom in area and area 1015 surrounding inner circle 1010 may be a zoom-out area. Based on one or more of single, double and triple clicks via user touch or use of a stylus on control screen display 1000, the surveying device may navigate to one or more zoom stages. Scroll bars 1020 and 1025 may be clicked and adjusted to reorient a surveying device according to one embodiment. Similarly, control screen display 1000 may include an inset image 1030 providing a graphical representation of the image data 1005 relative to image data that may be captured without zoom for a current orientation of the surveying device. Inset image 1030 may relate to an overview image and may be hid from control screen display 1000.

Referring now to FIG. 10B, graphical representation of the control screen display of FIG. 10A is depicted. Control screen 1040 identifies zoom-in area 1045 and zoom-out area 1050. Based on an input, such as user touch or contact of a stylus with zoom-in area 1045, the control device may control surveying device to zoom-in. Similarly, based on an input, such as user touch or contact of a stylus with zoom-out area 1050, the control device may control surveying device to zoom-out. In one embodiment, a double-click in zoom-in area 1045 may result in the surveying device increasing zoom by a single factor, where a triple-click in zoom-in area 1045 may zoom-in to a full extent of the surveying device. A double-click in zoom-out area 1050 may result in the surveying device decreasing zoom by a single factor, where a triple-click in zoom-out area 1050 may zoom-out to the full extent of the surveying device. When zoom-in or zoom-out to the full extent, the surveying device may be configured to select a different imaging device or camera. Selection of a different camera and display of image data may be seamless, such that a user does not experience delay in presentation of image date from a first to a second camera of the surveying device. Single clicks (e.g., a single tap) or contact inputs to control screen display 1040 may result in the survey device turning to the desired position.

Control screen display 1040 may include an inset image 1055 providing a graphical representation of the image data that may be navigated to by the surveying device for an orientation of the surveying device. Inset image 1055 may include display element 1060 identifying the particular zoom position relative to overview image. In certain embodiments, selections or inputs may be tracked within inset image 1055 for aiming a surveying device.

Referring now to FIG. 10C, a graphical representation is depicted of control screen display according to another embodiment. Control screen display 1065 allows for display of image data, such as video image data, and turning and zooming the surveying device based on one or more inputs relative to display of the video image data. According to one embodiment, zoom-in functionality is provided by an input on the display of video image data 1070. By way of example, zoom-in functionality is provided to areas within and outside of the inner circle 1075 of control screen display 1065. Zoom-out functionality is provided by an input to selection of overview image 1055.

In one embodiment, a double-click in display area 1070 may result in a turn to the selected point and increase of zoom a single factor. A triple-click in display area 1070 may turn and zoom-in to the full extent. A double-click in overview image 1055 may result in a turn to the selected point and zoom-out by a single factor. A triple-click in overview image 1055 may result in a turn to the selected point and zoom-out to the full extent.

According to one embodiment, the smart zoom functionality may be integrated with the dynamic joystick functionality. For example, drag commands of a control device for turning a surveying device may be detected in combination or association with smart zoom commands. Smart zoom functionality may additionally be configured to allow for a zoom in a three dimensional view, map view and to one or more points of interest. Smart zoom may similarly allow for a zoom to one or more of a prism, GNSS, point, start of line, arc, etc. Smart zoom functionality may additionally be configured for selecting or zooming relative to one or more points in a three-dimensional display.

Figure 11A:
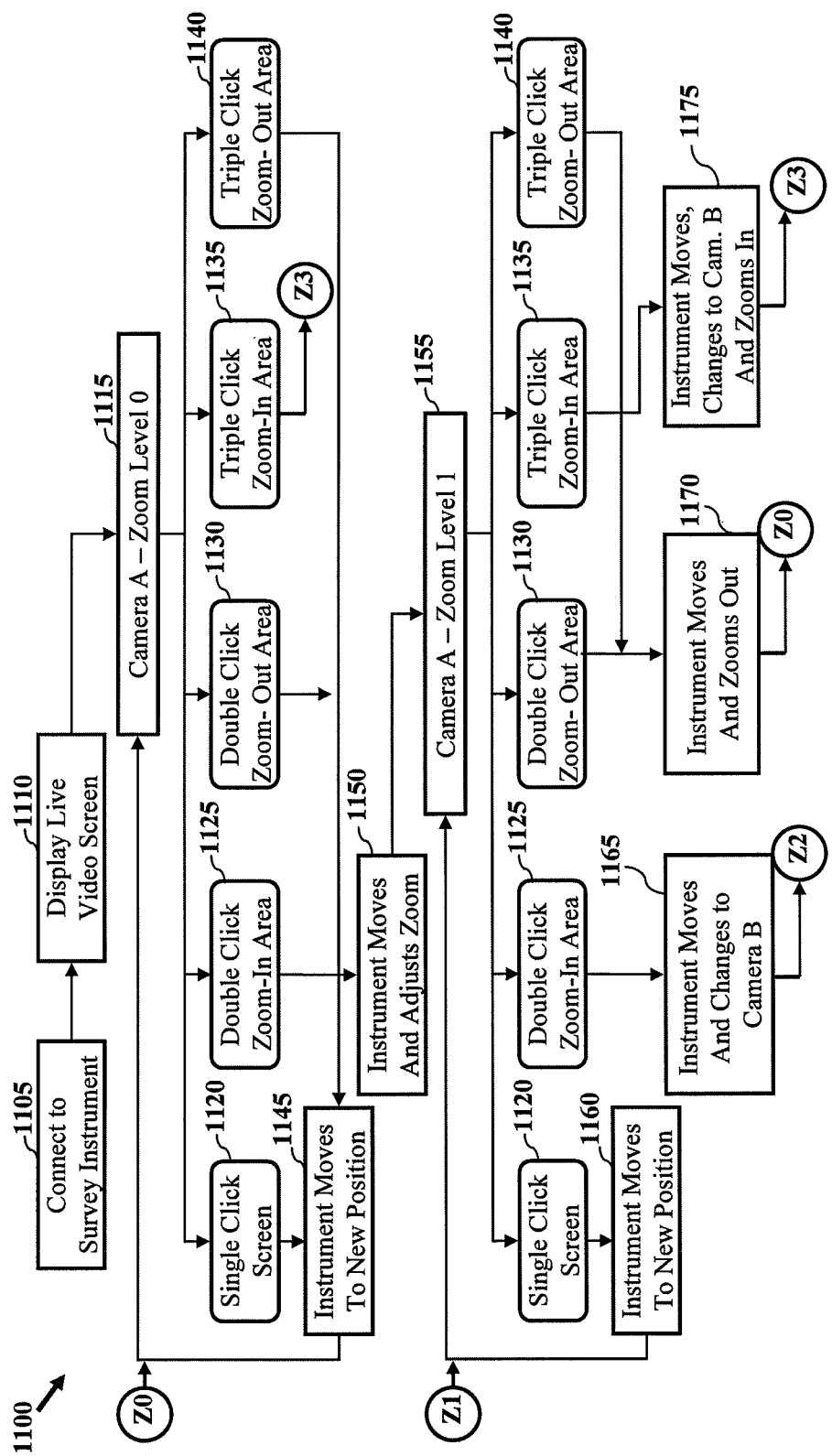
FIGS. 11A-11B depict graphical representations of smart zoom functionality according to one or more embodiments.
Figure 11B:
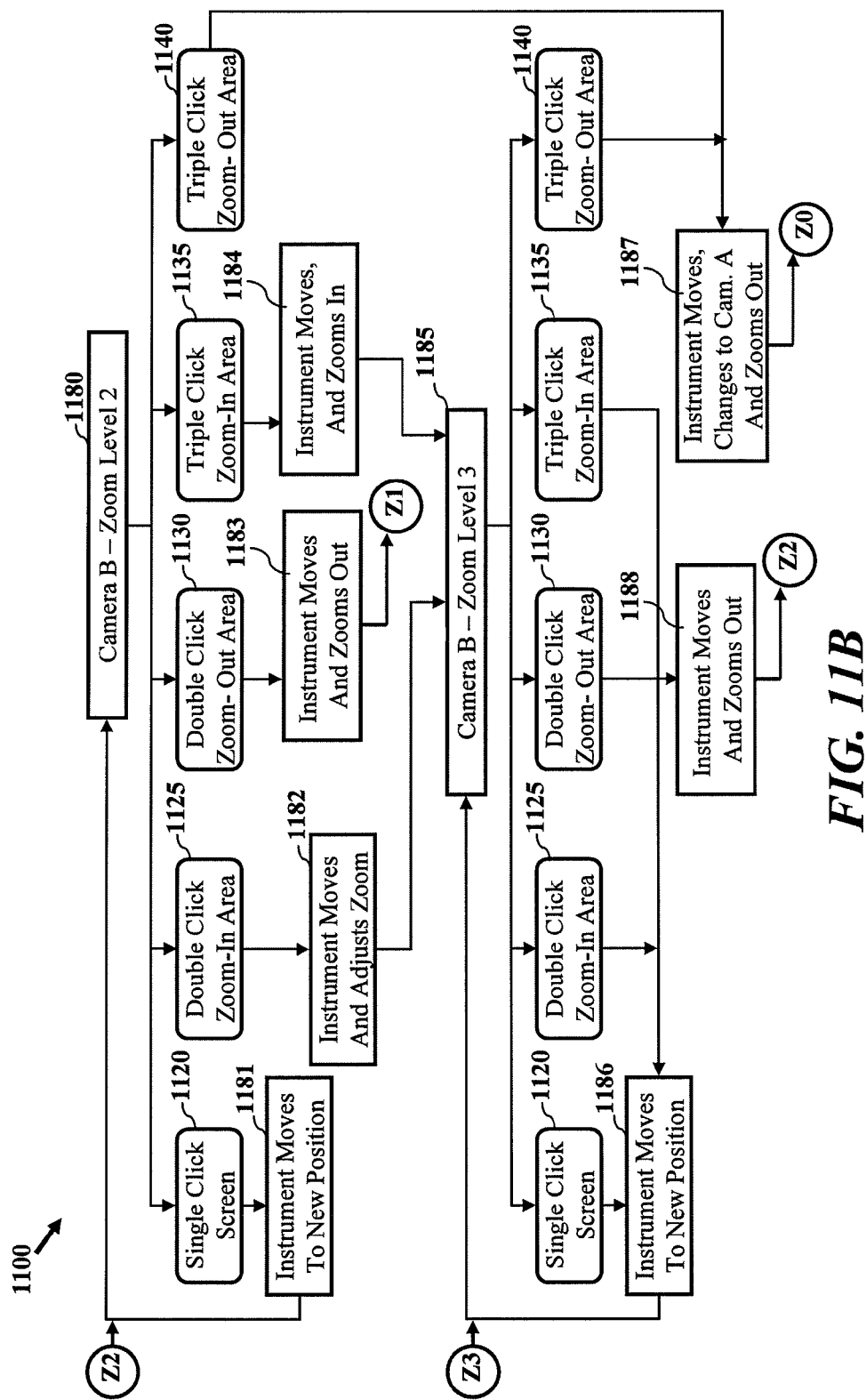

Referring now to FIGS. 11A-11B, graphical representations of smart zoom functionality are depicted according to one or more embodiments. FIGS. 11A-11B depict multiple operation paths 1100 that may be employed to navigate to one or more zoom levels of a surveying device.

Referring first to FIG. 11A, a control device (e.g., control device 105) may connect to a surveying instrument (e.g., surveying device 110) at block 1105 and display live video data on a control screen at block 1110. The control device may be configured to display image data associated with a first camera (e.g., camera A in FIG. 11A) of the surveying device at block 1115. Camera A may be set to a zoom level of zero (e.g., no zoom or zoom out to the fullest extent) at block 1115. Based on a user input to aim or control display of image data, the control device may generate one or more commands for a surveying device. Exemplary input commands in FIG. 11A include a single click on a control screen 1120, double click on zoom-in area 1125, double click zoom-out area 1130, triple click on zoom in area 1135 and triple click zoom-out area 1140.

From block 1115 to a single click on a control screen 1120, to a double click on zoom-out area 1130, or to triple click zoom-out area 1140, the surveying instrument may move to a new position at block 1145 based on the input. From block 1115 to a double click on zoom-in area 1125, the surveying instrument may move to a new position and adjust zoom at block 1150 based on the input. Based on the adjustment and navigation to a zoom level, the surveying device may present a zoom level, such as a zoom-in level, at block 1155. From block 1115 to a triple click on zoom-in area 1135 the surveying device may move to a new position and zoom to the full extent with block 1184, zoom level three of FIG. 11B.

From a zoom level of a first camera at block 1155, the control device may receive one or more smart zoom commands. From a zoom level at block 1155 to a single click on a control screen 1120, the surveying instrument may move to a new position at block 1160 based on the input. From a zoom level at block 1155 to a double click on zoom-in area 1125, the surveying instrument may be reoriented and adjust a zoom level at block 1165. In FIGS. 11A-11B, the additional level of zoom is described as switching to a separate imaging device. However, it should be appreciated that a single imaging in device may provide a plurality (e.g., 20 or more) zoom levels. From a zoom level at block 1155 to a double click on zoom-out area 1130 or triple click on zoom-out area 1140, the surveying instrument may be reoriented and adjust zoom level zero at block 1170. From a zoom level at block 1155 to a triple click on zoom-in area 1135, the surveying instrument may be reoriented and adjust a zoom level three of a second camera at block 1175.

Referring now to FIG. 11B, a second camera of a surveying device may provide a zoom level at block 1180. The zoom levels of a second camera of the surveying device (e.g., camera B in FIG. 11B) may provide an increased zoom (e.g., relative to camera A). From block 1180, the control device may receive one or more smart zoom commands. From a zoom level at block 1180 to a single click on a control screen 1120, the surveying instrument may move to a new position at block 1181 based on the input. From a zoom level at block 1180 to a double click on zoom-in area 1125, the surveying instrument may be reoriented and adjust a zoom-in level at block 1182. From a zoom level at block 1180 to a double click on zoom-out area 1130, the surveying instrument may be reoriented and adjust zoom-out level at block 1183, the zoom level set to block 1155. From a zoom level at block 1180 to a triple click on zoom-in area 1135, the surveying instrument may be reoriented and adjust a zoom-in to level three of a second camera at block 1184.

Zoom level three at block 1185, may relate to the full extent a surveying device may zoom-in. From block 1185 to a single click on a control screen 1120, to a double click on zoom-in area 1125, or triple click on zoom-in area 1135, the surveying instrument may move to a new position at block 1186 based on the input. From block 1185 to a double click on zoom-out area 1130, the surveying instrument may move to its new position and zoom at block 1188 to zoom level two at block 1180. From a zoom level at block 1180 or block 1185 to a triple click on zoom-out area 1140, the surveying device may change to camera A and select a first zoom level at block 1187.

Although operation paths 1100 of FIGS. 11A-11B are described relative to four zoom levels and two cameras on a surveying device, it should be appreciated that the embodiments disclosed herein may be applied to other arrangements. For example, in one the surveying device may include a single camera. In another embodiment the surveying device may include multiple image devices. In yet another embodiment, the surveying device may display image data from another source. It should also be appreciated that the disclosure is no limited to four zoom levels.

While this disclosure has been particularly shown and described with references to exemplary embodiments thereof, it will be understood by those skilled in the art that various changes in form and details may be made therein without departing from the scope of the embodiments encompassed by the appended claims.

What is claimed is:

1. A method for controlling a surveying device, the method comprising the acts of: displaying, by a device, a control screen including image data captured by a surveying device; detecting an input associated with the control screen; determining a control command for the surveying device based on the input associated with the control screen; and controlling, by the device, operation of the surveying device based on the control command, wherein the surveying device is configured to rotate in one more of a horizontal and vertical direction based on the control command; wherein the control command translates a tracked length of the input to an adjustment command, wherein the adjustment commands is scaled to provide one of a fine and coarse adjustment.

2. The method of claim 1, wherein the control screen displays one or more of image and video data received by the surveying device.

3. The method of claim 1, wherein the surveying device is configured for one or more of an electronic distance measurement, coordinate determination and angular measurement.

4. The method of claim 1, wherein the input is based on contact to the control screen including one or more of a control screen contact, tap command and drag command relative to the control screen.

5. The method of claim 1, wherein the input is based on motion of the control device.

6. The method of claim 1, wherein the control command is determined by tracking motion of contact to the control screen.

7. The method of claim 1, wherein the control command adjusts the position of the surveying device based on motion characteristics of the input command.

8. The method of claim 1, wherein the control command translates contact to the control screen to control movement of the surveying device.

9. The method of claim 1, wherein the control command adjusts the surveying device in a direction opposite to the input command.

10. The method of claim 1, wherein the control command filters movement of the input command in one axis.

11. The method of claim 1, wherein the control command causes reduced movement in the vertical axis relative to the horizontal axis.

12. The method of claim 1, wherein the control command scales the movement of the input command based on a distance measurement performed by the surveying device.

13. The method of claim 1, further comprising initiating a tracking routine of the input based on contact to the control screen.

14. The method of claim 1, further comprising updating the display of the control device based on image data received from the surveying device following the control command.

15. A system comprising: a surveying device, and a control device configured to control operation of the surveying device, the control device comprising a processor configured to: display a control screen including image data captured by a surveying device; detect an input associated with the control screen; determine a control command for the surveying device based on the input associated with the control screen; and control, by the device, operation of the surveying device based on the control command, wherein the surveying device is configured to rotate in one more of a horizontal and vertical direction based on the control command; wherein the control command translates a tracked length of the input to an adjustment command, wherein the adjustment commands is scaled to provide one of a fine and coarse adjustment.

16. The system of claim 15, wherein the control screen displays one or more of image and video data received by the surveying device.

17. The system of claim 15, wherein the surveying device is configured for one or more of an electronic distance measurement, coordinate determination and angular measurement.

18. The system of claim 15, wherein the input is based on contact to the control screen including one or more of a control screen contact, tap command and drag command relative to the control screen.

19. The system of claim 15, wherein the input is based on motion of the control device.

20. The system of claim 15, wherein the control command is determined by tracking motion of contact to the control screen.

21. The system of claim 15, wherein the control command adjusts the position of the surveying device based on motion characteristics of the input command.

22. The system of claim 15, wherein the control command translates contact to the control screen to control movement of the surveying device.

23. The system of claim 15, wherein the control command adjusts the surveying device in a direction opposite to the input command.

24. The system of claim 15, wherein the control command filters movement of the input command in one axis.

25. The system of claim 15, wherein the control command causes reduced movement in the vertical axis relative to the horizontal axis.

26. The system of claim 15, wherein the control command scales the movement of the input command based on a distance measurement performed by the surveying device.

27. The system of claim 15, further comprising initiating a tracking routine of the input based on contact to the control screen.

28. The system of claim 15, further comprising updating the display of the control device based on image data received from the surveying device following the control command.

29. A computer program product stored on a non-transitory computer readable medium including computer executable code for controlling a surveying device, the computer program product comprising: computer readable code to display a control screen including image data captured by a surveying device; computer readable code to detect an input associated with the control screen; computer readable code to determine a control command for the surveying device based on the input associated with the control screen; and computer readable code to control operation of the surveying device based on the control command, wherein the surveying device is configured to rotate in one more of a horizontal and vertical direction based on the control command; wherein the control command translates a tracked length of the input to an adjustment command, wherein the adjustment commands is scaled to provide one of a fine and coarse adjustment.

30. A method for controlling a surveying device, the method comprising the acts of: displaying, by a device, video image data on a control screen, the video image data received from a surveying device; detecting an input contact command associated with the control screen; tracking the input contact command to generate a control command for the surveying device; and controlling, by the device, operation of the surveying device based on the control command, wherein the surveying device is configured to rotate in one more of a horizontal and vertical direction based on the control command, and video image data displayed by the control device is updated based on rotation of the surveying device; wherein the control command translates a tracked length of the input to an adjustment command, wherein the adjustment commands is scaled to provide one of a fine and coarse adjustment.

31. The method of claim 30, wherein the surveying device is configured for one or more of electronic distance measurement, coordinate determination and angular measurements.

32. The method of claim 30, wherein the input is based on contact to the control screen including one or more of a control screen contact, tap command and drag command relative to the control screen.

33. The method of claim 30, wherein the input is based on motion of the control device.

34. The method of claim 30, wherein the control command is determined by tracking motion of contact to the control screen.

35. The method of claim 30, wherein the control command adjusts the position of the surveying device based on motion characteristics of the input command.

36. The method of claim 30, wherein the control command translates contact to the control screen to control movement of the surveying device.

37. The method of claim 30, wherein the control command adjusts the surveying device in a direction opposite to the input command.

38. The method of claim 30, wherein the control command filters movement of the input command in one axis.

39. The method of claim 30, wherein the control command causes reduced movement in the vertical axis relative to the horizontal axis.

40. The method of claim 30, wherein the control command scales the movement of the input command based on a distance measurement performed by the surveying device.

41. The method of claim 30, further comprising initiating tracking of the input command based on contact to the control screen.

42. The method of claim 30, further comprising updating the display of the control device based on image data received from the surveying device following the control command.

43. A method for controlling a surveying device, the method comprising the acts of: displaying, by a device, video image data on a control screen, the video image data received from a surveying device; detecting an input contact command associated with the control screen; determining one or more of a zoom and position adjustment based on the input contact command; and controlling, by the device, operation of the surveying device based on the determining, wherein the surveying device is configured to for at least one of repositioning the position of the surveying device and adjusting zoom of the surveying device; wherein the surveying device is configured to rotate in one more of a horizontal and vertical direction based on the control command; wherein the control command translates a tracked length of the input to an adjustment command, wherein the adjustment commands is scaled to provide one of a fine and coarse adjustment.

44. The method of claim 43, wherein the surveying device is configured for one or more of electronic distance measurement, coordinate determination and angular measurements.

45. The method of claim 43, wherein the input is based on contact to the control screen including one or more of a control screen contact, tap command and drag command relative to the control screen.

46. The method of claim 43, wherein the input is based on motion of the control device.

47. The method of claim 43, wherein the control command is determined by tracking motion of contact to the control screen.

48. The method of claim 43, wherein the control command adjusts the position of the surveying device based on motion characteristics of the input command.

49. The method of claim 43, wherein the control command translates contact to the control screen to control movement of the surveying device.

50. The method of claim 43, wherein the control command adjusts the surveying device in a direction opposite to the input command.

51. The method of claim 43, wherein the control command filters movement of the input command in one axis.

52. The method of claim 43, wherein the control command causes reduced movement in the vertical axis relative to the horizontal axis.

53. The method of claim 43, wherein the control command scales the movement of the input command based on a distance measurement performed by the surveying device.

54. The method of claim 43, further comprising initiating a tracking routine of the input command based on contact to the control screen.

55. The method of claim 43, further comprising updating the display of the control device based on image data received from the surveying device following the control command.

* * * * *